United States Patent
Yu et al.

(10) Patent No.: US 11,886,383 B2
(45) Date of Patent: Jan. 30, 2024

(54) METHOD, DEVICE AND COMPUTER PROGRAM PRODUCT FOR MANAGING FILE SYSTEM

(71) Applicant: EMC IP Holding Company LLC, Hopkinton, MA (US)

(72) Inventors: Ying Yu, Chengdu (CN); Jing Li, Chengdu (CN); Jia Huang, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 190 days.

(21) Appl. No.: 17/321,821

(22) Filed: May 17, 2021

(65) Prior Publication Data

US 2022/0229807 A1    Jul. 21, 2022

(30) Foreign Application Priority Data

Jan. 21, 2021  (CN) .......................... 202110082266.5

(51) Int. Cl.
   *G06F 16/11*    (2019.01)
(52) U.S. Cl.
   CPC .......... *G06F 16/128* (2019.01); *G06F 16/122* (2019.01)
(58) Field of Classification Search
   CPC ..... G06F 16/128; G06F 16/16; G06F 16/1734
   See application file for complete search history.

(56) References Cited

U.S. PATENT DOCUMENTS

| | | | |
|---|---|---|---|
| 8,239,880 B1* | 8/2012 | Caccavale | G06F 9/542 719/318 |
| 8,667,509 B1* | 3/2014 | Caccavale | G06F 9/542 719/318 |
| 8,763,015 B1* | 6/2014 | Caccavale | G06F 9/542 714/1 |
| 8,880,473 B1* | 11/2014 | Havemose | G06F 11/1451 707/649 |
| 9,075,668 B1* | 7/2015 | Hushon | G16H 40/20 |
| 9,141,534 B2* | 9/2015 | D'Abreu | G11C 16/349 |
| 9,542,396 B1* | 1/2017 | Pawar | G06F 11/1471 |
| 9,792,056 B1 | 10/2017 | Gao et al. | |
| 10,810,060 B2* | 10/2020 | Novogran | G06F 9/542 |
| 11,055,300 B2* | 7/2021 | Zhang | G06F 16/9038 |
| 11,093,357 B2 | 8/2021 | Liu et al. | |
| 2006/0041593 A1* | 2/2006 | Borthakur | G06F 16/10 |
| 2006/0218344 A1 | 9/2006 | Yoshida et al. | |
| 2013/0339375 A1* | 12/2013 | Adayikkoth | G06F 16/1734 707/754 |
| 2016/0124974 A1* | 5/2016 | Plumb | G06F 21/6218 707/689 |

(Continued)

*Primary Examiner* — Robert W Beausoliel, Jr.
*Assistant Examiner* — Susan F Rayyan
(74) *Attorney, Agent, or Firm* — BainwoodHuang (57) ABSTRACT

Techniques for managing a file system involve: receiving an event published by the file system, the event being associated with an operation on an object in the file system; determining a value of a counter corresponding to the event based on execution information of the operation; determining a target action corresponding to the value of the counter based on a trigger strategy associated with the counter, the trigger strategy defining at least one action that can be triggered by the counter; and generating an indication for causing the file system to execute the target action. Accordingly, file system management in finer granularity can be provided.

19 Claims, 4 Drawing Sheets

(56) References Cited

U.S. PATENT DOCUMENTS

| | | | |
|---|---|---|---|
| 2017/0371546 A1 | 12/2017 | Rivera et al. | |
| 2018/0024873 A1* | 1/2018 | Milliron | G06F 11/3065 |
| | | | 719/318 |
| 2018/0219888 A1* | 8/2018 | Apostolopoulos | |
| | | | H04L 63/1425 |
| 2018/0302309 A1* | 10/2018 | Cooke | G06F 9/542 |
| 2019/0065065 A1* | 2/2019 | Huang | G06F 3/065 |
| 2019/0313218 A1* | 10/2019 | Cooke | G06F 9/542 |
| 2021/0133145 A1* | 5/2021 | Gong | G06N 20/00 |

* cited by examiner

METHOD, DEVICE AND COMPUTER PROGRAM PRODUCT FOR MANAGING FILE SYSTEM

CROSS-REFERENCE TO RELATED APPLICATION

This application claims priority to Chinese Patent Application No. CN202110082266.5, on file at the China National Intellectual Property Administration (CNIPA), having a filing date of Jan. 21, 2021, and having "METHOD, DEVICE AND COMPUTER PROGRAM PRODUCT FOR MANAGING FILE SYSTEM" as a title, the contents and teachings of which are herein incorporated by reference in their entirety.

TECHNICAL FIELD

The embodiments of the present disclosure relate to the field of computers, and more particularly, to a method, a device, and a computer program product for managing a file system.

BACKGROUND

In the process of managing a file system, people specify a series of management strategies by configuring some time-based strategies. For example, people may configure regular file backups, create snapshots, delete expired backups, or delete expired snapshots. However, the time-based management strategies may be inefficient in some scenarios. For example, if some important data are modified multiple times in a short period of time, and the cycle of creating a snapshot may be too long, this may cause the data to be unable to be restored in the event of a failure. Or, if the cycle of creating the snapshot is too short, this may cause unnecessary waste of resources.

SUMMARY OF THE INVENTION

An embodiment of the present disclosure provides a solution for managing a file system. According to a first aspect of the present disclosure, a method for managing a file system is provided. The method includes: receiving an event published by the file system, the event being associated with an operation on an object in the file system; determining a value of a counter corresponding to the event based on execution information of the operation; determining a target action corresponding to the value of the counter based on a trigger strategy associated with the counter, the trigger strategy defining at least one action that can be triggered by the counter; and generating an indication for causing the file system to execute the target action.

According to a second aspect of the present disclosure, an electronic device is proposed. The device includes: at least one processing unit; and at least one memory that is coupled to the at least one processing unit and stores instructions for execution by the at least one processing unit, wherein the instructions, when executed by the at least one processing unit, cause the device to execute actions including: receiving an event published by a file system, the event being associated with an operation on an object in the file system; determining a value of a counter corresponding to the event based on execution information of the operation; determining a target action corresponding to the value of the counter based on a trigger strategy associated with the counter, the trigger strategy defining at least one action that can be triggered by the counter; and generating an indication for causing the file system to execute the target action.

In a third aspect of the present disclosure, a computer program product is provided. The computer program product is stored in a non-transitory computer storage medium and includes machine-executable instructions, wherein the machine-executable instructions, when run in a device, cause the device to perform any step of the method described according to the first aspect of the present disclosure.

The Summary of the Invention section is provided in order to introduce the selection of concepts in a simplified form, which will be further described in the Detailed Description below. The Summary of the Invention section is neither intended to identify key features or essential features of the present disclosure, nor intended to limit the scope of the present disclosure.

BRIEF DESCRIPTION OF THE DRAWINGS

The above and other objectives, features, and advantages of the present disclosure will become more apparent by describing example embodiments of the present disclosure in detail with reference to the accompanying drawings, and in the example embodiments of the present disclosure, the same reference numerals generally represent the same components.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described in more detail below with reference to the accompanying drawings. Although the preferred embodiments of the present disclosure are shown in the accompanying drawings, it should be understood that the present disclosure can be implemented in various forms and should not be limited by the embodiments set forth herein. Rather, the embodiments are provided to make the present disclosure more thoroughly and completely and to fully convey the scope of the present disclosure to those skilled in the art.

The term "include" and variants thereof used herein indicate open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" means "at least one further embodiment." The terms "first," "second," and the like may refer to different or the same objects. Other explicit and implicit definitions may also be included below.

In the process of managing a file system, people expect to improve the stability of the file system or improve the efficiency of the file system through some management operations. As discussed above, people may define some time-based management strategies. However, the time-based management strategies may be inefficient in some scenarios. For example, if some important data are modified multiple times in a short period of time, and the cycle of creating a snapshot may be too long, this may cause the data to be unable to be restored in the event of a failure. Or, if the cycle of creating the snapshot is too short, this may cause unnecessary waste of resources.

According to the embodiments of the present disclosure, a solution for managing a file system is provided. In the solution, firstly, an event published by the file system is received, wherein the event is associated with an operation on an object in the file system. Afterwards, a value of a counter corresponding to the event is determined based on execution information of the operation. Accordingly, a target action corresponding to the value of the counter is determined based on a trigger strategy associated with the counter, and an indication for causing the file system to execute the target action is generated. In such a manner, file system management in finer granularity can be provided by the embodiments of the present disclosure. In addition, the embodiments of the present disclosure improve the flexibility of managing the file system.

The solution of the present disclosure will be described below with reference to the accompanying drawings.

Figure 1:
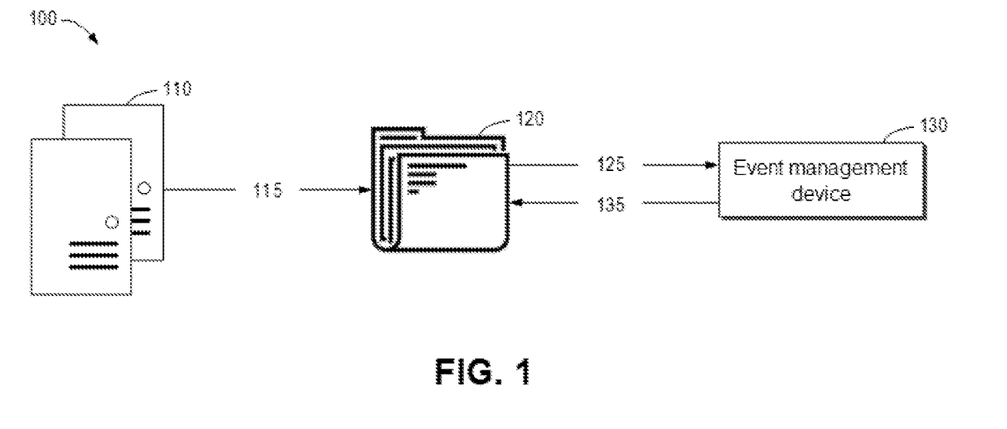
FIG. 1 shows a schematic diagram of an example environment in which an embodiment of the present disclosure may be implemented.

FIG. 1 shows example environment 100 in which the embodiments of the present disclosure may be implemented. As shown in FIG. 1, environment 100 includes client 110, file system 120, and event management device 130. As shown in FIG. 1, client 110 may send operation request 115 to file system 120, for example, requesting to access an object and create an object in file system 120, requesting to delete an object in file system 120, or requesting to modify an object in file system 120. The object may include, for example, one or more folders or one or more files in file system 120.

In some implementations, file system 120 may be deployed with a common event publishing (CEP) module. The CEP module may publish a corresponding event based on receiving operation request 115 or operation request 115 being executed.

Figure 2A:
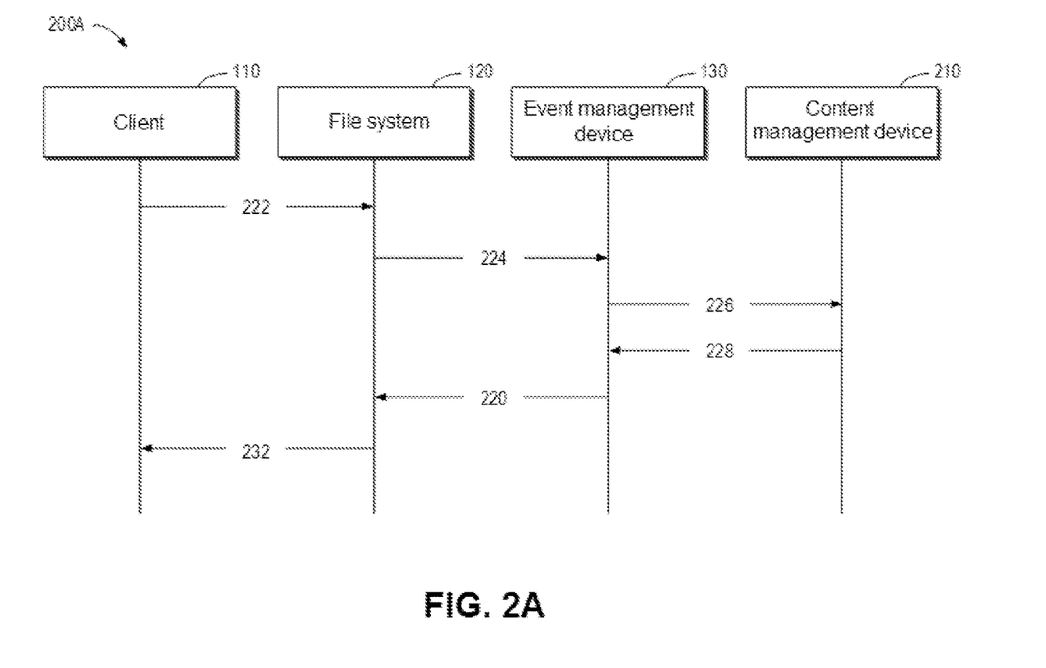
FIGS. 2A to 2B show schematic diagrams of an event handling process according to an embodiment of the present disclosure.

In some implementations, the CEP module may publish a first type of event (pre event) in response to receiving operation request 115. FIG. 2A shows a schematic diagram of a process for handling a first type of event according to the embodiments of the present disclosure.

As shown in FIG. 2A, at 222, client 110 may send an operation request to file system 120, for example, requesting to delete a specific file in file system 120.

At 224, file system 120 may send the first type of event published via the CEP module to event management device 130. Event management device 130 may be, for example, a common event publishing agent (CEPA) server.

At 226, event management device 130 may forward the received first type of event to content management device 210, so that content management device 210 may determine whether the operation request can be executed or not. Content management device 210 may be, for example, a Content/Quota Management (CQM) device.

At 228, content management device 210 may send an indication to event management device 130 as to whether execution is allowed or not.

At 220, event management device 130 further forwards the indication to file system 120.

At 232, file system 120 determines whether to execute the operation request or not based on the indication, and sends an execution result to client 110.

Figure 2B:
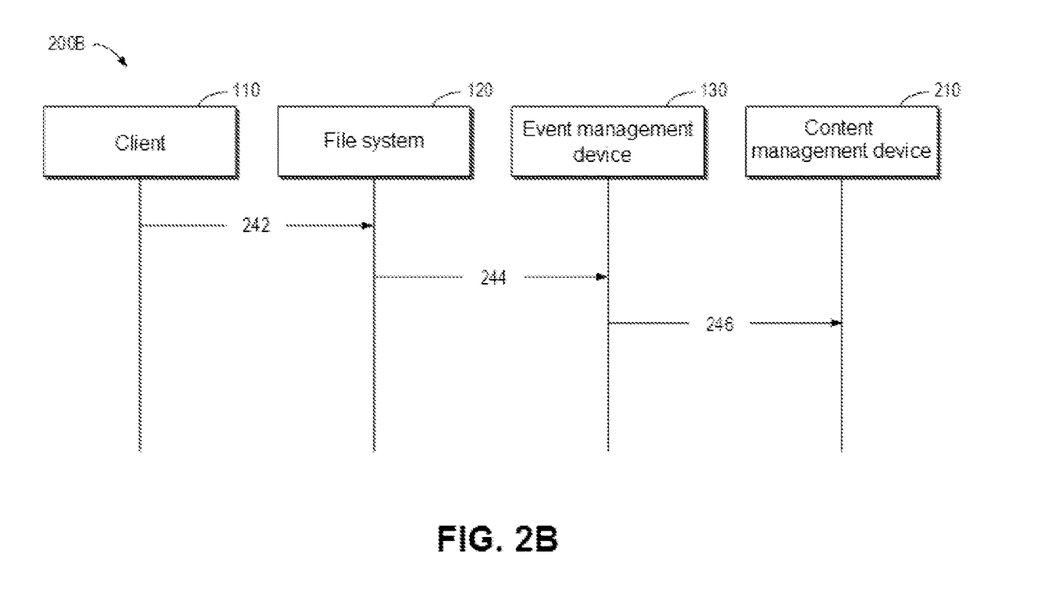

In some implementations, the CEP module may further publish a second type of event (post event) in response to receiving that operation request 115 has been successfully executed in file system 120. Alternatively or additionally, the CEP module may further publish a third type of event (post error event) in response to operation request 115 being unsuccessfully executed in file system 120. The handling processes for the second type of event and the third type of event are similar. FIG. 2B shows a schematic diagram of a process for handling a second type or third type of event according to an embodiment of the present disclosure.

As shown in FIG. 2B, at 242, client 110 may send an operation request to file system 120, for example, requesting to modify a specific file in file system 120.

At 224, after the operation request is successfully executed or unsuccessfully executed, file system 120 may send the second type or third type of event published via the CEP module to event management device 130.

At 226, event management device 130 may forward the received second type or third type of event to content management device 210 for auditing by content management device 210 without receiving additional indication from content management device 210.

The first type of event (pre event), the second type of event (post event), and the third type of event (post error event) discussed above may also be referred to as basic CEP events.

Continuing to refer to FIG. 1, as shown in FIG. 1, file system 120 may publish corresponding event 125 before the operation request is executed, and after the operation request is successfully executed or unsuccessfully executed. In some implementations, event 125 may be generated based on the three different types of basic events discussed above.

In some implementations, a set of events corresponding to different operation requests can be defined. For example, a file deletion event may be defined based on the first type of event (pre event). In an example, an example of the file deletion event can be expressed as:

Event="0x20"
path="\\vdm_air_c48.vita.ad\CHECK$\vdm_air2_fs1\folder1\onebyone\KzM
W8FYp" flag="0x2" protocol="0"' server="VDM_AIR2_C48"
share="vdm_air2_fs1" clientIP="10.229.86.47" serverIP="10.229.94.159"
sourceID="0" timeStamp="0xF3116660009332A" userSid="S-1-5-21-
3745703139-2415706905-3042037632-1105" ownerSid="S-1-5-21-
843271493-1212945995-848348500-544"
fileSize="0x10003C" bytesRead="0x0"
bytesWritten="0x0" desiredAccess="0x0" createDispo="0x0"
ntStatus="0x0"
relativePath=\\VDM_AIR2_C48\vdm_air2_fs1\folder1\onebyone\KzMW8FYp Among them, "0x20" may, for example, represent an identification of event 125, for example, indicating EVENT_FILE_DELETE, that is, to identify that event 125 is a file deletion event.

It should be understood that any other appropriate types of events can further be defined based on the basic CEP events. Examples include but are not limited to: a file creation event, a file deletion event, a file write event, a file read event, a file rename event, a file access permission setting event, a file security attribute setting event, a folder closing event, a folder creation event, a folder deletion event, a folder opening event, a folder rename event, a folder security attribute setting event, a folder access permission setting event, etc.

It should be understood that one or more of the above events can be defined according to the basic CEP event according to the needs of a control strategy. For example, the folder opening event can be defined based on the second type of event (post event), so that the event is published only after a folder is opened.

Continuing to refer to FIG. 1, event management device 130 may receive event 125 published by file system 120. In some implementations, event management device 130 can further set counters corresponding to different events, so as to count different events 125 received.

When a value of the counter satisfies a certain condition, event management device 130 may, for example, generate indication 135 for causing file system 120 to execute a predetermined action, and send indication 135 to file system 120. The detailed process of generating indication 135 will be described with reference to FIG. 3.

Figure 3:
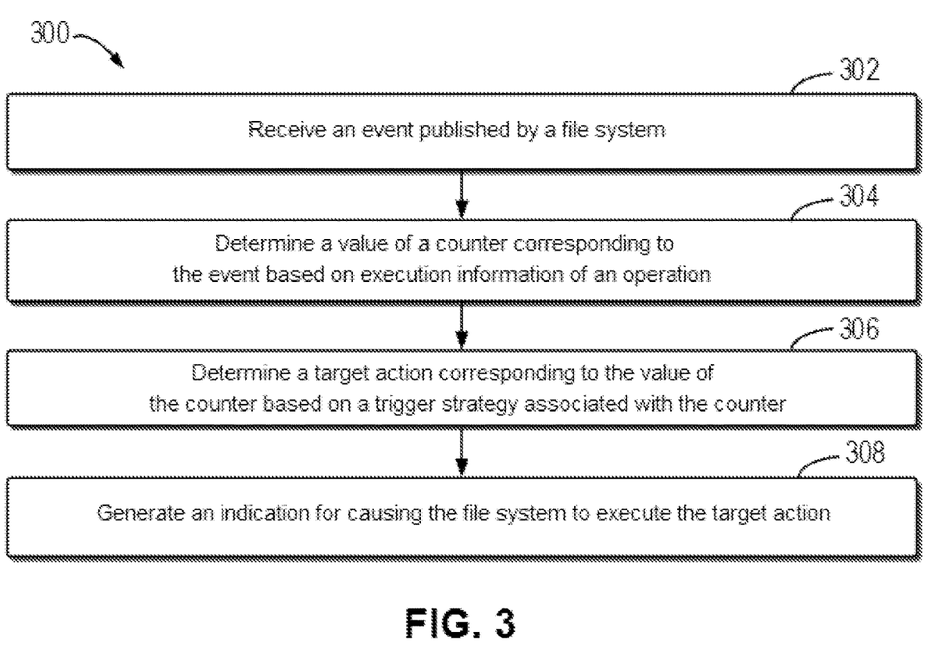
FIG. 3 shows a flowchart of a process for managing a file system according to an embodiment of the present disclosure.

FIG. 3 shows a flowchart of process 300 for managing a file system according to some embodiments of the present disclosure. Process 300 may be implemented, for example, by event management device 130 shown in FIG. 1.

As shown in FIG. 3, in block 302, event management device 130 receives event 125 published by file system 120, wherein event 125 is associated with an operation on an object in file system 120.

As discussed above with reference to FIG. 1, file system 120 may, for example, publish events associated with different operations via a CEP module based on basic CEP events. Examples thereof include but are not limited to: a file creation event, a file deletion event, a file write event, a file read event, a file rename event, a file access permission setting event, a file security attribute setting event, a folder closing event, a folder creation event, a folder deletion event, a folder opening event, a folder rename event, a folder security attribute setting event, a folder access permission setting event, etc.

In block 304, event management device 130 determines a value of a counter corresponding to event 125 based on execution information of the operation. In some implementations, event management device 130 may determine the execution information of the operation based on an event type of event 125.

In some implementations, event 125 is based on a first type of event (pre event), that is, the event type indicates that event 125 is published in response to receiving request 115 associated with the operation. Accordingly, event management device 130 may obtain execution information from content management device 210, wherein the execution information indicates whether the operation is allowed to be executed or not. Specifically, as described with reference to step 228, event management device 130 may receive an indication whether the operation is allowed to be executed or not from content management device 210.

Additionally, in response to determining that the execution information indicates that the operation is allowed to be executed, event management device 130 may increment the counter to determine the value of the counter. For example, taking a file deletion event as an example, if the value of the counter corresponding to the event was previously 0, event management device 130 may increment the value of the counter by 1 when receiving an indication to allow execution of the deletion operation.

In some implementations, event 125 may further be published based on a second type of event (post event) or a third type of event (post error event). Correspondingly, the execution information may include, for example, an execution status of the operation, and event management device 130 may determine the execution status of the operation based on the event type, wherein the execution status indicates that the operation is executed successfully or unsuccessfully. In an example, when it is determined that received event 125 is based on a second type of event (post event), event management device 130 may determine that the operation is executed successfully based on the event type. When it is determined that received event 125 is based on a third type of event (post error event), event management device 130 may determine that the operation is executed unsuccessfully based on the event type.

Accordingly, event management device 130 may increment the counter corresponding to event 125. In an example, for example, when a file creation event based on the second type of event is received, event management device 130 may increment a counter related to the file creation event by 1.

In block 306, event management device 130 determines a target action corresponding to the value of the counter based on a trigger strategy associated with the counter, wherein the trigger strategy defines at least one action that can be triggered by the counter.

In some implementations, event management device 130 may acquire the configured trigger strategy. The trigger strategy, for example, defines at least one trigger threshold and an action corresponding to the at least one trigger threshold. Event management device 130 may determine the target action from at least one action based on comparison between the value of the counter and the corresponding trigger threshold.

Taking a file deletion event as an example, the trigger strategy may, for example, define one trigger threshold, such as 1, and its corresponding action may be positioned as a file creation snapshot, for example. Based on this approach, when a current value of the counter associated with the file deletion event is 1, event management device 130 can determine that the value has reached the trigger threshold, thereby triggering the action corresponding to the trigger threshold, that is, creating a snapshot for the file.

Taking folder modification as another example, the trigger strategy may define multiple trigger thresholds, for example, 100 and 200. The trigger strategy can further define a first trigger action when the number of folder modification times reaches 100 and a second trigger action when the number of folder modification times reaches 200.

Accordingly, event management device 130 may compare the current value (for example, 100) of the counter with the trigger threshold, and determine to execute the first trigger action. When the value of the counter continues to be accumulated to 200, event management device 130 will determine to execute the second trigger action. It should be understood that when the value of the counter is between the trigger thresholds (for example, 150), event management device 130 may determine not to execute any action.

In some implementations, for the counter configured with only one trigger threshold, after the value of the counter reaches the trigger threshold, event management device 130 may reset the counter.

In block 308, event management device 130 generates indication 135 to cause the file system to execute the target action.

In some implementations, event management device 130 may generate indication 135 according to the determined target action, and send the indication to file system 120. In some implementations, file system 120 may execute the target action according to indication 135, thereby realizing dynamic management.

In some implementations, if event 125 is based on the first type of event (pre event), file system 120 may further determine whether to execute operation request 115 according to an execution result of the target action.

In an example, event 125 is a file deletion event, and the target action is to create a snapshot of the file. If file system 120 determines that the snapshot creation of the file fails, file system 120 may refuse to execute the action of deleting the file, even though a file deletion request of file system 120 has been allowed. Based on this manner, the stability of the file system can further be improved.

In another example, file system 120, for example, may also delete the file when it is determined that the file deletion request has been allowed, regardless of whether the target action is successfully executed or not.

Based on the solution discussed above, the embodiments of the present disclosure can perform file system management in finer granularity based on the events. In addition, the approach can also facilitate the dynamic maintenance of the management strategy and improve the efficiency.

Figure 4:
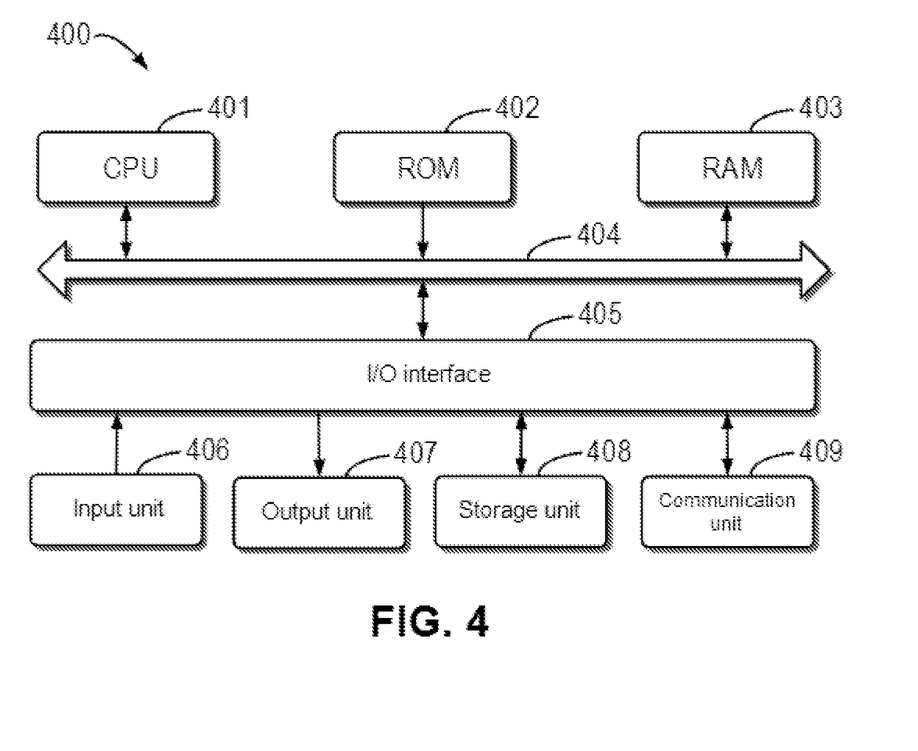
FIG. 4 shows a schematic block diagram of an example device that can be configured to implement an embodiment of the content of the present disclosure.

FIG. 4 shows a schematic block diagram of example device 400 that can be configured to implement an embodiment of the content of the present disclosure. For example, event management device 130 according to the embodiments of the present disclosure may be implemented by device 400. As shown in the drawing, device 400 includes central processing unit (CPU) 401 that may execute various appropriate actions and processing according to computer program instructions stored in read-only memory (ROM) 402 or computer program instructions loaded from storage unit 408 into random access memory (RAM) 403. In RAM 403, various programs and data required for the operation of device 400 may further be stored. CPU 401, ROM 402, and RAM 403 are connected to each other through bus 404. Input/output (I/O) interface 405 is also connected to bus 404.

A plurality of components in device 400 are connected to I/O interface 405, including: input unit 406, such as a keyboard and a mouse; output unit 407, such as various types of displays and speakers; storage unit 408, such as a magnetic disk and an optical disk; and communication unit 409, such as a network card, a modem, and a wireless communication transceiver. Communication unit 409 allows device 400 to exchange information/data with other devices over a computer network such as the Internet and/or various telecommunication networks.

The various processes and processing described above, such as process 300, may be executed by processing unit 401. For example, in some embodiments, process 300 may be implemented as a computer software program that is tangibly included in a machine-readable medium, for example, storage unit 408. In some embodiments, part or all of the computer program may be loaded and/or mounted to device 400 via ROM 402 and/or communication unit 409. When the computer program is loaded into RAM 403 and executed by CPU 401, one or more actions of process 300 described above may be implemented.

The present disclosure may be a method, an apparatus, a system, and/or a computer program product. The computer program product may include a computer-readable storage medium on which computer-readable program instructions for executing various aspects of the present disclosure are loaded.

The computer-readable storage medium may be a tangible device that can hold and store instructions used by an instruction execution device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or a flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein can be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in the computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, state setting data, or source code or object code written in any combination of one or more programming languages, including object oriented programming languages, such as Smalltalk, C++, and the like, and conventional procedural programming languages, such as the "C" language or similar programming languages. The computer-readable program instructions may be executed entirely on a user's computer, partly on a user's computer, as a stand-alone software package, partly on a user's computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), may be subjected to personalized customization by utilizing status information of the computer-readable program instructions. The electronic circuit may execute the computer-readable program instructions to implement various aspects of the present disclosure.

Various aspects of the present disclosure are described here with reference to flowcharts and/or block diagrams of the method, the apparatus (system), and the computer program product according to the embodiments of the present disclosure. It should be understood that each block of the flowcharts and/or block diagrams and combinations of blocks in the flowcharts and/or block diagrams can be implemented by computer-readable program instructions.

The computer-readable program instructions may be provided to a processing unit of a general-purpose computer, a special-purpose computer, or a further programmable data processing apparatus, thereby producing a machine, such that the instructions, when executed by the processing unit of the computer or the further programmable data processing apparatus, produce an apparatus for implementing functions/actions specified in one or more blocks in the flowcharts and/or block diagrams. The computer-readable program instructions may also be stored in a computer-readable storage medium, and the instructions cause a computer, a programmable data processing apparatus, and/or other devices to work in a specific manner; and thus the computer-readable medium having stored instructions includes an article of manufacture that includes instructions that implement various aspects of the functions/actions specified in one or more blocks in the flowcharts and/or block diagrams.

The computer-readable program instructions may also be loaded to a computer, a further programmable data processing apparatus, or a further device, so that a series of operating steps may be executed on the computer, the further programmable data processing apparatus, or the further device to produce a computer-implemented process, such that the instructions executed on the computer, the further programmable data processing apparatus, or the further device may implement the functions/actions specified in one or more blocks in the flowcharts and/or block diagrams.

The flowcharts and block diagrams in the drawings illustrate the possibly implemented architectures, functions, and operations of the systems, methods, and computer program products according to various embodiments of the present disclosure. In this regard, each block in the flowcharts or block diagrams may represent a module, a program segment, or part of an instruction, and the module, program segment, or part of the instruction includes one or more executable instructions for implementing specified logical functions. In some alternative implementations, functions marked in the blocks may also occur in an order different from that marked in the accompanying drawings. For example, two successive blocks may actually be executed substantially in parallel, and sometimes they may also be executed in an inverse order, which depends on involved functions. It should be further noted that each block in the block diagrams and/or flowcharts as well as a combination of blocks in the block diagrams and/or flowcharts may be implemented using a special hardware-based system that executes specified functions or actions, or using a combination of special hardware and computer instructions.

Various implementations of the present disclosure have been described above. The foregoing description is by way of example rather than exhaustive, and is not limited to the disclosed implementations. Numerous modifications and alterations are apparent to persons of ordinary skill in the art without departing from the scope and spirit of the illustrated implementations. The selection of terms used herein is intended to best explain the principles and practical applications of the implementations or the improvements to technologies on the market, or to enable other persons of ordinary skill in the art to understand the implementations disclosed herein.

The invention claimed is:

1. A method for managing a file system, comprising:
receiving an event published by a file system, the event being associated with an operation on an object in the file system;
determining a value of a counter corresponding to the event based on execution information of the operation;
determining a target action corresponding to the value of the counter based on a trigger strategy associated with the counter, the trigger strategy defining at least one action that can be triggered by the counter; and
generating an indication for causing the file system to execute the target action;
wherein the event is published by the file system prior to executing the operation on the object in the file system; and
wherein the method further comprises:
after generating the indication, executing the target action in the file system; and
based on an execution result of the target action, executing the operation on the object in the file system.

2. The method according to claim 1, further comprising:
determining the execution information of the operation based on an event type of the event.

3. The method according to claim 2, wherein the event type indicates that the event is published in response to receiving a request associated with the operation, and determining the execution information comprises:
acquiring the execution information, the execution information indicating whether the operation is allowed to be executed.

4. The method according to claim 3, wherein determining the value of the counter corresponding to the event comprises:
in response to determining that the execution information indicates that the operation is allowed to be executed, incrementing the counter to determine the value of the counter.

5. The method according to claim 2, wherein the execution information comprises an execution status of the operation, and wherein determining the execution information of the operation comprises:
determining the execution status of the operation based on the event type, the execution status indicating that the operation is executed successfully or unsuccessfully.

6. The method according to claim 1, wherein the at least one action corresponds to a corresponding trigger threshold of the counter, and determining the target action corresponding to the value of the counter comprises:
determining the target action from the at least one action based on comparison of the value with the corresponding trigger threshold.

7. The method according to claim 1, further comprising:
resetting the counter.

8. The method according to claim 1, wherein the operation comprises at least one of the following operations on files or directories in the file system: read operation, create operation, modify operation, or delete operation.

9. An electronic device, comprising:
at least one processing unit;
at least one memory that is coupled to the at least one processing unit and stores instructions for execution by the at least one processing unit, wherein the instructions, when executed by the at least one processing unit, cause the device to execute actions comprising:
receiving an event published by a file system, the event being associated with an operation on an object in the file system;
determining a value of a counter corresponding to the event based on execution information of the operation;
determining a target action corresponding to the value of the counter based on a trigger strategy associated with the counter, the trigger strategy defining at least one action that can be triggered by the counter; and
generating an indication for causing the file system to execute the target action;
wherein the event is published by the file system prior to executing the operation on the object in the file system; and
wherein the method further comprises:
after generating the indication, executing the target action in the file system; and
based on an execution result of the target action,
executing the operation on the object in the file system.

10. The device according to claim 9, wherein the actions further comprise:
determining the execution information of the operation based on an event type of the event.

11. The device according to claim 10, wherein the event type indicates that the event is published in response to receiving a request associated with the operation, and determining the execution information comprises:
acquiring the execution information, the execution information indicating whether the operation is allowed to be executed.

12. The device according to claim 11, wherein determining the value of the counter corresponding to the event comprises:
in response to determining that the execution information indicates that the operation is allowed to be executed, incrementing the counter to determine the value of the counter.

13. The device according to claim 10, wherein the execution information comprises an execution status of the operation, and wherein determining the execution information of the operation comprises:
determining the execution status of the operation based on the event type, the execution status indicating that the operation is executed successfully or unsuccessfully.

14. The device according to claim 9, wherein the at least one action corresponds to a corresponding trigger threshold of the counter, and determining the target action corresponding to the value of the counter comprises:
determining the target action from the at least one action based on comparison of the value with the corresponding trigger threshold.

15. The device according to claim 9, wherein the actions further comprise:
resetting the counter.

16. The device according to claim 9, wherein the operation comprises at least one of the following operations on files or directories in the file system: read operation, create operation, modify operation or delete operation.

17. A computer program product having a non-transitory computer readable medium which stores a set of instructions to manage a file system; the set of instructions, when carried out by computerized circuitry, causing the computerized circuitry to perform a method of:
receiving an event published by a file system, the event being associated with an operation on an object in the file system;
determining a value of a counter corresponding to the event based on execution information of the operation;
determining a target action corresponding to the value of the counter based on a trigger strategy associated with the counter, the trigger strategy defining at least one action that can be triggered by the counter; and
generating an indication for causing the file system to execute the target action;
wherein the event is published by the file system prior to executing the operation on the object in the file system; and
wherein the method further comprises:
after generating the indication, executing the target action in the file system; and
based on an execution result of the target action,
executing the operation on the object in the file system.

18. The method according to claim 1, further comprising:
receiving, from a client of the file system, an operation request to perform the operation on the object in the file system;
in response to receiving the request, generating the event based on a predetermined control strategy defining a set of events corresponding to a respective set of operation requests; and
after generating the event, publishing the event using a module of the file system.

19. The method according to claim 1, wherein determining the target action includes:
after determining the value of the counter, comparing the value of the counter to a predetermined threshold that triggers, as the target action, a snapshot creation operation on the object in the file system; and
wherein the method further comprises:
in response to comparing the value of the counter to the predetermined threshold, issuing a request to perform the snapshot creation operation on the object.

* * * * *